US012263821B2

(12) United States Patent
van Thiel

(10) Patent No.: US 12,263,821 B2
(45) Date of Patent: Apr. 1, 2025

(54) RELIABLE PARKING BRAKE VALVE UNIT WITH A BYPASS VALVE

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/589,106

(22) Filed: Feb. 27, 2024

(65) Prior Publication Data

US 2024/0198991 A1 Jun. 20, 2024

Related U.S. Application Data

(63) Continuation of application No. PCT/EP2022/073022, filed on Aug. 18, 2022.

(30) Foreign Application Priority Data

Aug. 31, 2021 (DE) ..................... 10 2021 122 498.5

(51) Int. Cl.
*B60T 13/68* (2006.01)
*B60T 8/171* (2006.01)
(Continued)

(52) U.S. Cl.
CPC ............ *B60T 13/683* (2013.01); *B60T 8/171* (2013.01); *B60T 13/268* (2013.01);
(Continued)

(58) Field of Classification Search
CPC ...... B60T 13/683; B60T 8/171; B60T 13/268; B60T 13/385; B60T 13/58; B60T 17/22;
(Continued)

(56) References Cited

U.S. PATENT DOCUMENTS 10,501,062 B2 * 12/2019 Wulf ......................... B60T 8/94
2005/0029859 A1 2/2005 Bensch et al.
(Continued)

FOREIGN PATENT DOCUMENTS

DE 103 36 611 A1 3/2005
DE 10 2008 007 877 B3 11/2009
(Continued)

OTHER PUBLICATIONS

Translation of German Patent No. DE 102008007877 to Zeman obtained from website: https://worldwide.espacenet.com on Nov. 21, 2024.*

(Continued)

*Primary Examiner* — Pamela Rodriguez
(74) *Attorney, Agent, or Firm* — Walter Ottesen, P.A.

(57) ABSTRACT

An electropneumatic parking brake device is for supplying air to and exhausting air from spring-loaded accumulator brake cylinders of an electronically controllable pneumatic braking system for a vehicle and includes a parking brake valve unit with a reservoir port for receiving reservoir pressure from a parking brake reservoir. The parking brake valve unit sets a parking brake pressure at a spring-loaded accumulator port depending on a parking brake signal. A non-return valve is arranged between the parking brake valve unit and the parking brake reservoir to prevent compressed air from flowing back from the parking brake valve unit to the reservoir. A bypass valve is provided which can be switched to supply air to and exhaust it from the spring-loaded accumulator port. The bypass valve is activated and switched independently of the parking brake valve unit.

18 Claims, 7 Drawing Sheets

(51) Int. Cl.

| | |
|---|---|
| ***B60T 13/26*** | (2006.01) |
| ***B60T 13/38*** | (2006.01) |
| ***B60T 13/58*** | (2006.01) |
| ***B60T 17/22*** | (2006.01) |

(52) U.S. Cl.
CPC ............ *B60T 13/385* (2013.01); *B60T 13/58* (2013.01); *B60T 17/22* (2013.01); *B60T 2270/402* (2013.01); *B60T 2270/406* (2013.01); *B60T 2270/413* (2013.01); *B60T 2270/414* (2013.01)

(58) Field of Classification Search
CPC ......... B60T 2270/402; B60T 2270/406; B60T 2270/413; B60T 2270/414
See application file for complete search history.

(56) References Cited

U.S. PATENT DOCUMENTS

| | | | | |
|---|---|---|---|---|
| 2010/0237690 | A1* | 9/2010 | Forster | B60T 13/263 303/13 |
| 2020/0047730 | A1* | 2/2020 | Van Thiel | B60T 15/027 |
| 2020/0247381 | A1 | 8/2020 | Van Thiel | |
| 2022/0266807 | A1 | 8/2022 | van Thiel | |
| 2022/0297656 | A1 | 9/2022 | van Thiel et al. | |

FOREIGN PATENT DOCUMENTS

| | | | |
|---|---|---|---|
| DE | 10 2009 037 636 | A1 | 2/2011 |
| DE | 10 2015 008 377 | A1 | 12/2016 |
| DE | 10 2017 005 757 | A1 | 12/2018 |
| DE | 10 2019 131 110 | A1 | 5/2021 |
| DE | 10 2019 133 010 | A1 | 6/2021 |
| WO | 2019/068393 | A1 | 4/2019 |

OTHER PUBLICATIONS

English translation and Written Opinion of the International Searching Authority dated Dec. 14, 2022 for international application PCT/EP2022/073022 on which this application is based.

International Search Report of the European Patent Office dated Dec. 14, 2022 for international application PCT/EP2022/073022 on which this application is based.

* cited by examiner

RELIABLE PARKING BRAKE VALVE UNIT WITH A BYPASS VALVE

CROSS-REFERENCE TO RELATED APPLICATIONS

This application is a continuation application of international patent application PCT/EP2022/073022, filed Aug. 18, 2022, designating the United States and claiming priority from German application 10 2021 122 498.5, filed Aug. 31, 2021, and the entire content of both applications is incorporated herein by reference.

TECHNICAL FIELD

The disclosure relates to an electropneumatic parking brake device for supplying air to and exhausting it from one or more spring-loaded accumulator cylinders of an electronically controllable pneumatic braking system for a vehicle, including a parking brake valve unit with a reservoir port for receiving reservoir pressure from a parking brake reservoir, wherein the parking brake valve unit sets a parking brake pressure at least at one spring-loaded accumulator port depending on a parking brake signal, and a non-return valve arranged between the parking brake valve unit and the parking brake reservoir in order to prevent compressed air from flowing back from the parking brake valve unit to the parking brake reservoir.

The disclosure moreover relates to an electronically controllable pneumatic braking system for a vehicle, including at least a first front axle brake actuator and a second front axle brake actuator at a front axle of the vehicle and at least a first rear axle brake actuator and a second rear axle brake actuator at a rear axle of the vehicle, as well as a primary system with a primary control unit at least for activating the first front axle brake actuator, the second front axle brake actuator, the first rear axle brake actuator, and the second rear axle brake actuator.

The disclosure furthermore relates to a method for controlling an electronically controllable pneumatic braking system, having the steps: activating a parking brake valve unit via a parking brake control unit for supplying air to and exhausting it from at least one spring-loaded accumulator brake cylinder at a rear axle of a commercial vehicle, wherein the parking brake valve unit is connected via a non-return valve to a parking brake reservoir and receives reservoir pressure from the latter; and identifying a fault in the electronically controllable pneumatic braking system, in particular the parking brake control unit or parking brake valve unit.

BACKGROUND

Electropneumatic valve assemblies for actuating a parking brake function are used in both Europe and the United States. A parking brake function of an electropneumatic braking system generally employs so-called spring-loaded accumulator brake cylinders which are applied by virtue of a spring force and are opened when air is supplied to them. When driving, these spring-loaded accumulator brake cylinders are therefore supplied with air and hence opened, while they are exhausted of air in the parked state and hence are applied.

A solution for supplying air to such spring-loaded accumulator brake cylinders is disclosed in DE 10 2017 005 757 A1. The solution disclosed there employs a pilot valve unit and a main valve unit, wherein the pilot valve unit includes an electromagnetic solenoid valve in the form of a bistable valve. The main valve unit is formed in the solution disclosed there by a relay valve. Depending on the switched position of the electromagnetic bistable valve, a control pressure is set at the main valve unit which then correspondingly sets a volume pressure for the spring-loaded accumulator brake cylinders. A bistable valve denotes a solenoid valve which has two stable switch positions, in particular a stable air-supply position and a stable air-exhaust position. For this purpose, an armature can be brought into a first position by energizing a first electromagnet such that the solenoid valve assumes the air-supply position, and the armature can be brought into a second position by energizing a second electromagnet such that the solenoid valve assumes the air-exhaust position. If no other force then acts on the armature, or if it can be locked mechanically and/or magnetically in the positions, the respective switch position is stable because it can be maintained without further energization.

A braking system with a further generic parking brake device is disclosed in DE 103 36 611 A1. It discloses a braking system, operated by a pressurizing medium, for a vehicle with a parking brake function in which, as a consequence of manual actuation of an electrical parking brake signal emitter, at least one wheel brake of the braking system can be actuated without actuating a brake pedal via an actuator to which a pressurizing medium can be applied. Based on this, a braking system, operated by a pressurizing medium, for a vehicle is provided in which a parking brake function which can be actuated via an electrical signal emitter can be integrated with little effort while observing the relevant safety conditions for braking systems. This is achieved by a parking brake module being provided into which an electronic control device and a valve device which can be electrically actuated by the electronic control device are integrated, wherein, on receipt of an electrical actuation signal, requesting the activation of the parking brake function, of the parking brake signal emitter, the electronic control device activates the parking brake function, wherein the electronic control device controls the application of a pressurizing medium to the actuator via the electrically actuatable valve device as part of the parking brake function.

DE 10 2008 007 877 B3 moreover discloses a parking brake device for motor vehicles with a spring-loaded accumulator brake cylinder which can be activated by a relay valve, wherein the relay valve can be activated via a safety valve in the form of a 3/2-way valve, the outlet of which can be connected selectively to one of two inlets, wherein the inlets of the safety valve can be connected selectively to a source of pressurizing medium or to atmospheric pressure via a first or a second solenoid valve, and wherein a select low valve is connected to one inlet and to the outlet of the safety valve, and an outlet of the select low valve is connected to a control inlet of the relay valve. It is intended that the stability of the system is improved as a result.

DE 10 2015 008 377 A1 furthermore discloses a parking brake module via which the application of pressurizing medium to at least one brake actuator can be controlled, wherein the parking brake module has an electronic control device, at least one solenoid valve which can be actuated by the control device, a valve which boosts the quantity of pressurizing medium and serves to apply pressurizing medium to the at least one brake actuator and at least one pressurizing medium inlet via which pressurizing medium can be fed to the parking brake module. The parking brake module has an emergency-release pressurizing medium port and a double non-return valve, the parking brake module has a first pressurizing medium line via which the emergency-release pressurizing medium port is fluidically connected to the supply inlet of the valve which boosts the quantity of pressurizing medium via a non-return valve in such a way that pressurizing medium flows through this first pressurizing medium line from the emergency-release pressurizing medium port to the valve which boosts the quantity of pressurizing medium if the pressure at the emergency-release pressurizing medium port is greater than the pressure at the supply inlet of the valve which boosts the quantity of pressurizing medium, and the parking brake module has a second pressurizing medium line via which the emergency-release pressurizing medium port or a further pressurizing medium port of the parking brake module is fluidically connected to an inlet of the double non-return valve in such a way that pressurizing medium flows through this second pressurizing medium line from the emergency-release pressurizing medium port to the double non-return valve if the pressure at the emergency-release pressurizing medium port is greater than the pressure at the inlet of the double non-return valve, or that pressurizing medium flows through this second pressurizing medium line from the further pressurizing medium port to the double non-return valve if the pressure at the further pressurizing medium port is greater than the pressure at the inlet of the double non-return valve.

Even if the above-described systems are advantageous and function well in practice, there is also a need to further improve the safety of such systems. In particular, it is intended that emergency application of the parking brake is possible, also in the case of systems activated "by wire", in the situation in which a parking braking system or a control unit activating the parking braking system does not function or functions incorrectly.

SUMMARY

The present disclosure achieves the object in the case of an electropneumatic parking brake device of the type mentioned at the beginning by a bypass valve being provided which can be switched to supply air to and exhaust it from the spring-loaded accumulator port, wherein the bypass valve is activated and switched independently of the parking brake valve unit.

The additional bypass valve which is provided in addition to the generally known parking brake valve unit, serves to supply air to and/or exhaust it from the spring-loaded accumulator port in addition to the parking brake valve unit, and can be activated and switched independently of the parking brake valve unit. The bypass valve thus forms a bypass for the parking brake valve unit and can be switched either to supply air to and/or exhaust it from the spring-loaded accumulator port in the situation in which the parking brake valve unit does not function or functions incorrectly or cannot be activated or cannot be activated correctly. In this respect, the disclosure is based on the idea that the bypass valve can be activated independently of the parking brake valve unit and can also be switched independently of the latter.

It has been shown that, in the case of electropneumatic parking brake devices in which a non-return valve is arranged between the parking brake valve unit and the parking brake reservoir in order to prevent the backflow of compressed air from the parking brake valve unit to the parking brake reservoir, emergency application "by wire" of the spring-loaded accumulator brake cylinders connected to the spring-loaded accumulator port is possible only with difficulty or is not possible at all. Typical routines for emergency application of spring-loaded accumulator brake cylinders include lowering the reservoir pressure of the parking brake reservoir, so-called "pumping down", in order in this way to lower the pressure which can usually be provided to the spring-loaded accumulator brake cylinders. If there is a fall in the reservoir pressure from which the working pressure for the spring-loaded accumulator brake cylinders is fed, the spring-loaded accumulator brake cylinders are applied automatically because they are applied by the force of the springs. However, if a non-return valve is provided, compressed air cannot flow back from the parking brake valve unit to the parking brake reservoir and thus also no pressure equalization of the spring-loaded accumulator brake cylinder to the lowered compressed air reservoir can take place. This means, irrespective of the level in the compressed air reservoir, that the spring-loaded accumulator brake cylinders remain released because the pressure prevailing in the latter is confined by the non-return valve. Supplying air to the spring-loaded accumulator brake cylinders and hence engagement of the spring-loaded accumulator brake cylinders is only possible when the parking brake valve unit is switched into an air-supply position. However, this is not possible particularly in the case of a fault in the parking brake valve unit or an electronic control unit activating the latter. Consequently, in these cases manual engagement of the spring-loaded accumulator brake cylinders must take place, for example by manually supplying air to the spring-loaded accumulator brake cylinders.

The disclosure offers a remedy here by the provision of the bypass valve which can preferably be switched both to supply air to and exhaust it from the spring-loaded accumulator port, and to be precise independently of the parking brake valve unit. In the situation in which the parking brake valve unit thus is not functioning or is functioning incorrectly or cannot be activated or cannot be activated correctly, the bypass valve unit can be switched manually or automatically in order to exhaust air from the spring-loaded accumulator port and consequently from the spring-loaded accumulator brake cylinders connected thereto. In this way, emergency engagement of the spring-loaded accumulator brake cylinders is also possible when the parking brake valve unit is not functioning or is functioning incorrectly or cannot be activated or cannot be activated correctly. Conversely, when the supply of air and hence the release of the spring-loaded accumulator brake cylinders does not function or functions incorrectly, the bypass valve can be switched in order to effect the supply of air to the spring-loaded accumulator port and hence to effect the release of the spring-loaded accumulator brake cylinders connected thereto.

The bypass valve can include one or more switchable electromagnetic valves which can in particular have a more cost-effective configuration than valves of the parking brake valve unit. The bypass valve serves only in the event of a fault in the parking brake valve unit to supply air to or exhaust it from the spring-loaded accumulator port and is thus used only very rarely when the vehicle is operating. It serves solely to enable a fail-operational mode in order thus to provide a redundancy level for the parking brake valve unit.

In an embodiment, the bypass valve is configured as electromagnetic and can be activated by a further electronic control unit which is independent of the parking brake valve unit. The parking brake valve unit is preferably activated by a parking brake control unit which can be part of the electropneumatic parking brake device. The parking brake control unit can be integrated with the parking brake valve unit to form a module. The parking brake control unit can have its own intelligence or only include end stages which are connected to a higher-level control unit via an electrical connection. The further electronic control unit which activates the bypass valve is different from the parking brake control unit. The further electronic control unit is preferably a control unit which is already present in the electronically controllable pneumatic braking system, or a control unit provided separately for the bypass valve. It is, however, particularly efficient and space-saving if a control unit which is already present in the electronically controllable pneumatic braking system is used to activate the bypass valve. In this way, it can be ensured that, in the situation in which the parking brake control unit has a fault, the bypass valve can still be activated and switched by the further control unit in order to supply air to or exhaust it from the spring-loaded accumulator port.

The electropneumatic parking brake device preferably has a bypass pressure sensor for detecting the parking brake pressure set at the spring-loaded accumulator port, wherein the bypass pressure sensor is connected to the further electronic control unit independent of the parking brake valve unit. In this way, the further electronic control unit can evaluate the pressure present at the spring-loaded accumulator port and set the bypass valve as a function thereof. Closed-loop control of the parking brake pressure can be implemented in this way.

It can furthermore be preferred that the bypass valve is monostable and can assume a blocking position and a throughflow position, wherein the bypass valve is stable in the blocking position. In this case, the bypass valve can, for example, take the form of a 2/2-way valve and be switched, spring-loaded, into the blocking position. Only by being energized will the bypass valve then be switched into the throughflow position in which air can be supplied to or exhausted from the spring-loaded accumulator port. In order to implement this in the case of a 2/2-way valve, the 2/2-way valve configured as a bypass valve is preferably connected to the spring-loaded accumulator port by a first bypass valve port and is connected to the parking brake reservoir by a second bypass valve port, or a reservoir pressure line which runs between the parking brake reservoir and the non-return valve such that the bypass valve bypasses the non-return valve. Where the parking brake reservoir then feeds compressed air and can supply a sufficiently high pressure, air can be supplied to the spring-loaded accumulator port by switching the bypass valve into the throughflow position, bypassing the non-return valve and the parking brake valve unit. Where, because of a fault or a fault-resolving routine, the parking brake reservoir is largely or completely unpressurized (for example by pumping down), the spring-loaded accumulator port can be connected to the then unpressurized parking brake reservoir by switching the bypass valve into the throughflow position, bypassing the parking brake valve unit and the non-return valve, such that air can in this case be exhausted from the spring-loaded accumulator port.

According to a further embodiment, it is provided that the bypass valve has a first bypass valve port connected to the spring-loaded accumulator port or to a main valve unit upstream from the spring-loaded accumulator port, and a second bypass valve port connected to an air-exhaust point. Alternatively, the bypass valve has a first bypass valve port connected to the spring-loaded accumulator port or to a main valve unit upstream from the spring-loaded accumulator port, and a second bypass valve port connected to the parking brake reservoir upstream from the non-return valve. The second bypass valve port can accordingly be connected either to the air-exhaust point or to the parking brake reservoir. This is in particular preferred when the bypass valve is configured as a 2/2-way valve as described above. If the second bypass valve port is connected only to the air-exhaust point, air can only be exhausted from the spring-loaded accumulator port by the bypass valve in the throughflow position. If, in contrast, the second bypass valve port is connected to the parking brake reservoir, air can be supplied to the spring-loaded accumulator port when the parking brake reservoir feeds sufficient pressure, and air can be exhausted from it when the parking brake reservoir is pumped down.

According to an embodiment, it is provided that the bypass valve is formed as one structural unit with the parking brake valve unit. The bypass valve can be accommodated with the parking brake valve unit in a module housing or simply flange-mounted to the parking brake valve unit or formatted with the latter. This is particularly advantageous because in this way the mounting effort can be reduced and components can have a compact form. Moreover, in this way interfaces between individual elements can be reduced and lines which can otherwise be prone to leaks omitted.

The bypass valve is preferably connected directly to a parking brake pressure line connected to the spring-loaded accumulator port downstream from the latter. This configuration is in particular advantageous when the bypass valve is outside the parking brake valve unit, for example flange-mounted to the latter or arranged thereon outside a module housing, or is constituted as a separate component. The direct connection of the bypass valve to a parking brake pressure line which is connected to the spring-loaded accumulator port downstream from the latter and in turn leads to the spring-loaded accumulator brake cylinder can result in the direct exhausting of air from or supply of air to the spring-loaded accumulator brake cylinder. It is also conceivable that the bypass valve is connected directly to the spring-loaded accumulator brake cylinder.

In an embodiment, the parking brake valve unit has a pilot valve unit and a main valve unit. Such a configuration is fundamentally known in the prior art. In such a configuration, the pilot valve unit is provided to supply a parking brake control pressure at the main valve unit which then sets the parking brake pressure at the spring-loaded accumulator port as a function of the received parking brake control pressure. For this purpose, the main valve unit is generally formed with a volume-boosting function and can include, for example, a relay valve or a pneumatically switchable main valve. Configurations of this type allow more efficient use of air because, when there is a variation in the parking brake pressure, only the parking brake control pressure with a lower volume needs to be exhausted such that an overall quantity of air consumed can be reduced.

The bypass valve is connected to the main valve unit, wherein the parking brake control pressure can be exhausted via the bypass valve. The bypass valve is in this way preferably connected to the main valve unit via the same line via which the pilot valve unit is also connected to the main valve unit. The main valve unit preferably has a purely pneumatic configuration and can therefore switch independently of a parking brake control unit and independently of a power source. In the situation in which the pilot valve unit does not function or functions incorrectly, the parking brake control pressure can in this way be exhausted via the bypass valve such that air is subsequently also exhausted from the spring-loaded accumulator port.

In an embodiment, the bypass valve is connected to a bypass branch line which branches off from a parking brake control pressure line via which the parking brake control pressure is supplied at the main valve unit from the pilot valve unit. In a further embodiment, a first shuttle valve which has a first shuttle valve port connected to the pilot valve unit, a second shuttle valve port connected to an anti-compounding port, and a third shuttle valve port connected to the main valve unit, is provided in the parking brake control pressure line. The first shuttle valve is preferably configured such that in each case the higher of the pressure present at the first shuttle valve port and at the second shuttle valve port is set at the third shuttle valve port. This configuration makes it possible to set at the main valve unit either the parking brake control pressure set by the pilot valve unit or a pressure supplied via the anti-compounding port.

An anti-compounding port is used in particular to avoid overloading brake actuators. In most braking systems, so-called tristop cylinders which can act as both service brake cylinders and parking brake cylinders are connected to the spring-loaded accumulator port. If air is then supplied to the spring-loaded accumulator part of the tristop cylinder in order to activate the parking brake function, it can occur that the service brake part of the tristop cylinder is also activated when, for example, an operator of the vehicle actuates a brake pedal. In this case, both the spring-loaded accumulator part and the service brake part would exert a force which can cause components to be overloaded. In the case of a so-called anti-compounding function, the service brake pressure set at the tristop cylinder is fed simultaneously, via the anti-compounding port, to the parking brake device which subsequently sets a parking brake pressure at the spring-loaded accumulator port in order in the same way to supply air to the spring-loaded accumulator part of the tristop cylinder and thus release it. This means that, in the same way in which the service brake part exerts a force, a force which is exerted by the spring-loaded accumulator part is reduced.

It can moreover be preferred that the bypass branch line branches off between the first shuttle valve port and the pilot valve unit. It is intended that the bypass valve is configured such that it can exhaust the parking brake control pressure and not the anti-compounding pressure which is supplied at the anti-compounding port. The anti-compounding function is thus maintained irrespective of the switching of the bypass valve.

In an embodiment, it is moreover provided that the parking brake valve unit has a compensation valve which is provided to maintain a parking brake control pressure set at the main valve unit by the pilot valve unit and thus at least partially compensate a leak at the pilot valve unit and/or the main valve unit. Leaks which can occur in the pilot valve unit and/or the main valve unit can advantageously be compensated by the compensation valve. This is advantageously enabled by a controllable pneumatic connection to the parking brake reservoir or to an exhaust port, which connection can be produced by the compensation valve.

The compensation valve is preferably configured as a pneumatically switchable 3/2-way valve and has a first compensation valve port connected to the non-return valve, a second compensation valve port connected to a line carrying the parking brake control pressure, and a third compensation valve port connected to an air-exhaust point. The compensation valve is preferably pretensioned, spring-loaded, into a first switched position in which the second compensation valve port is connected to the third compensation valve port and, if a compensation valve control pressure supplied at a compensation valve control port exceeds a compensation valve threshold value, switches into a second switched position in which the first compensation valve port is connected to the second compensation valve port. It is furthermore preferred that the compensation valve control pressure is a pressure present or set at the second compensation valve port, as a result of which pneumatic self-holding for the compensation valve is implemented. The compensation valve preferably has a restoring spring which pretensions the compensation valve into the first switched position. In particular by virtue of the configuration of a or the restoring spring, the compensation valve is advantageously configured to switch into the second switched position when the compensation valve threshold value is exceeded. The compensation valve threshold value advantageously lies within a range from 0.241 MPa (35 psi) and 0.379 MPa (55 psi), preferably from 0.276 MPa (40 psi) to 0.345 MPa (50 psi), and is preferably 0.310 MPA (45 psi).

It is advantageously provided that the second compensation valve port is connected pneumatically to the compensation valve control port via a compensation control path.

In an embodiment, it is provided that the compensation valve is configured so that it is flow-restricted, preferably in such a way that the connection of the first compensation valve port to the second compensation valve port and/or the connection of the second compensation valve port to the third compensation valve port is in each case flow-restricted. In particular, the compensation valve is a first restrictor for flow-restricting the pneumatic connection between the first compensation valve port and the second compensation valve port in the second switched position. In particular, the second compensation valve has a second restrictor for flow-restricting the pneumatic connection between the second compensation valve port and the third compensation valve port in the first switched position. In other embodiments, a common restrictor can be provided which is independent of the switched position of the compensation valve and is connected upstream or downstream of the compensation valve. Such a common restrictor can advantageously be arranged between the second compensation valve port and a branching node for the compensation control path. In an embodiment, it is provided that the parking brake valve unit and the bypass valve are supplied with electrical voltage by two independent voltage sources. The further electronic control unit is also preferably supplied by the voltage source which also supplies the bypass valve. In this way, the safety can be increased and a fail-operational mode enabled in a braking system which has two independent voltage sources.

In a second aspect, the disclosure achieves the object mentioned at the beginning in the case of an electronically controllable pneumatic braking system by the latter having an electropneumatic parking brake device according to one of the above-described embodiments of an electropneumatic parking brake device according to the first aspect of the disclosure, wherein at least one first spring-loaded accumulator cylinder at the rear axle is connected to the at least one spring-loaded accumulator port, and wherein the bypass valve can be switched in order to supply air to and exhaust it from the first spring-loaded accumulator cylinder, wherein the bypass valve is set and switched independently of the parking brake valve unit.

It is to be understood that the electropneumatic parking brake device according to the first aspect of the disclosure and the electronically controllable pneumatic braking system according to the second aspect of the disclosure have the same and similar subaspects. In this respect, reference is made to the above description in its entirety and embodiments, features, and advantages are to also be considered in the second aspect of the disclosure and included therein by reference.

In an embodiment of the electronically controllable pneumatic braking system it is provided that the parking brake valve unit is connected to a parking brake control unit and receives switching signals from the latter, wherein the bypass valve is connected to a further control unit independent of the parking brake valve unit and receives at least one bypass switching signal from the further control unit. The parking brake control unit is preferably connected to a first voltage source and is supplied with electrical voltage by the latter, and the further electronic control unit is connected to a second voltage source and is supplied with electrical voltage by the latter. The further electronic control unit is preferably a control unit, present in the electronically controllable pneumatic braking system, such as for example the primary control unit. The primary control unit is typically independent of the parking brake control unit. The parking brake control unit forms in many concepts a fallback level and in this respect also a secondary control unit for the first redundancy level of the electronically controllable pneumatic braking system. In the situation in which this redundancy level misfunctions, for example because the parking brake control unit malfunctions, the primary control unit can set the bypass valve and thus effect the exhausting of air from the spring-loaded accumulator brake cylinders or alternatively the supply of air to the spring-loaded accumulator brake cylinders. In the situation in which the parking brake valve unit is associated with the primary control unit, the bypass valve is preferably set by another control unit such as, for example, another secondary control unit which is supplied independently of the primary control unit.

In an embodiment of the electronically controllable pneumatic braking system, the latter moreover has a secondary system with a secondary control unit, at least for the purpose of activating the first front axle brake actuator, the second front axle brake actuator, the first rear axle brake actuator, and the second rear axle brake actuator, wherein in the situation in which a fault is identified in the primary system, the control of the electronically controllable pneumatic braking system is effected at least partially by the secondary system. The secondary system in this case forms a first fallback level. It can be provided that the secondary system can completely replace the primary system and in this respect the secondary control unit can also completely replace the functionality of the primary control unit. It can also be provided that the secondary control unit has only a limited range of functions of the primary control unit and in this respect complete functionality is not provided and instead a sufficient functionality for performing in particular a "limp home" maneuver.

In this variant, it can also be provided that the secondary control unit forms or has the further control unit which activates the bypass valve. In this case, the bypass valve can then be activated by the secondary control unit in the situation in which the primary control unit is not functioning or is functioning incorrectly and the parking brake control unit is also not functioning or is functioning incorrectly.

Other control units such as, for example, a control unit of an electronic steering system, a control unit of a trailer control module, a control unit of an air suspension system, or further control units can also preferably be provided within the scope of the disclosure as further control units for activating the bypass valve. For this purpose, it is then in each case preferred that the respective control unit is connected to a bus system or communicates with a higher-level control unit such that the further control unit is capable of setting switching signals for the bypass valve.

In a third aspect, the object mentioned at the beginning is achieved by a vehicle, in particular a commercial vehicle, with a front axle, at least one first rear axle, and an electronically controllable pneumatic braking system according to an above described embodiment of the electronically controllable pneumatic braking system according to the second aspect of the disclosure. It should be understood that the vehicle according to the third aspect of the disclosure, the electronically controllable pneumatic braking system according to the second aspect of the disclosure, and the electropneumatic parking brake device according to the first aspect of the disclosure have the same and/or similar subaspects. In this respect, for embodiments of the vehicle according to the third aspect of the disclosure, reference is made to the electronically controllable pneumatic braking system according to the second aspect of the disclosure and to the electropneumatic parking brake device according to the first aspect of the disclosure in their entirety.

In a fourth aspect of the disclosure, the object mentioned at the beginning is also achieved by a method for controlling an electronically controllable pneumatic braking system, preferably an electronically controllable pneumatic braking system according to one of the above-described embodiments according to the second aspect of the disclosure. The method preferably includes the steps: activating a parking brake valve unit via a parking brake control unit for the purpose of supplying air to and exhausting it from at least one spring-loaded accumulator brake cylinder at a rear axle of a commercial vehicle, wherein the parking brake valve unit is connected via a non-return valve to a parking brake reservoir and receives reservoir pressure from the latter; identifying a fault in the electronically controllable pneumatic braking system, in particular the parking brake control unit or/and the parking brake valve unit; switching a bypass valve, which is connected both to the at least one spring-loaded accumulator brake cylinder and to the parking brake reservoir, into an air-exhaust position for exhausting air from the at least one spring-loaded accumulator brake cylinder; wherein the bypass valve switches in response to a bypass switching signal which is supplied by a further electronic control unit which is independent of the parking brake control unit.

It should be understood that the electropneumatic parking brake device according to the first aspect of the disclosure, the electronically controllable pneumatic braking system according to the second aspect of the disclosure, the vehicle according to the third aspect of the disclosure, and the method for controlling an electronically controllable pneumatic braking system according to the fourth aspect of the disclosure have the same and similar subaspects. In this respect, for further embodiments of the method for controlling an electronically controllable pneumatic braking system, reference is made to the further embodiments, advantages, and features of the first three aspects of the disclosure in their entirety.

In an embodiment of the method it is provided that the parking brake control unit is connected to a first voltage source and is supplied with electrical voltage by the latter, and the further control unit is connected to a second voltage source and is supplied with electrical voltage by the latter.

The method can moreover include: lowering the reservoir pressure in the parking brake reservoir for the purpose of exhausting air from the at least one spring-loaded accumulator brake cylinder.

BRIEF DESCRIPTION OF DRAWINGS

The invention will now be described with reference to the drawings wherein.

DETAILED DESCRIPTION

Figure 1:
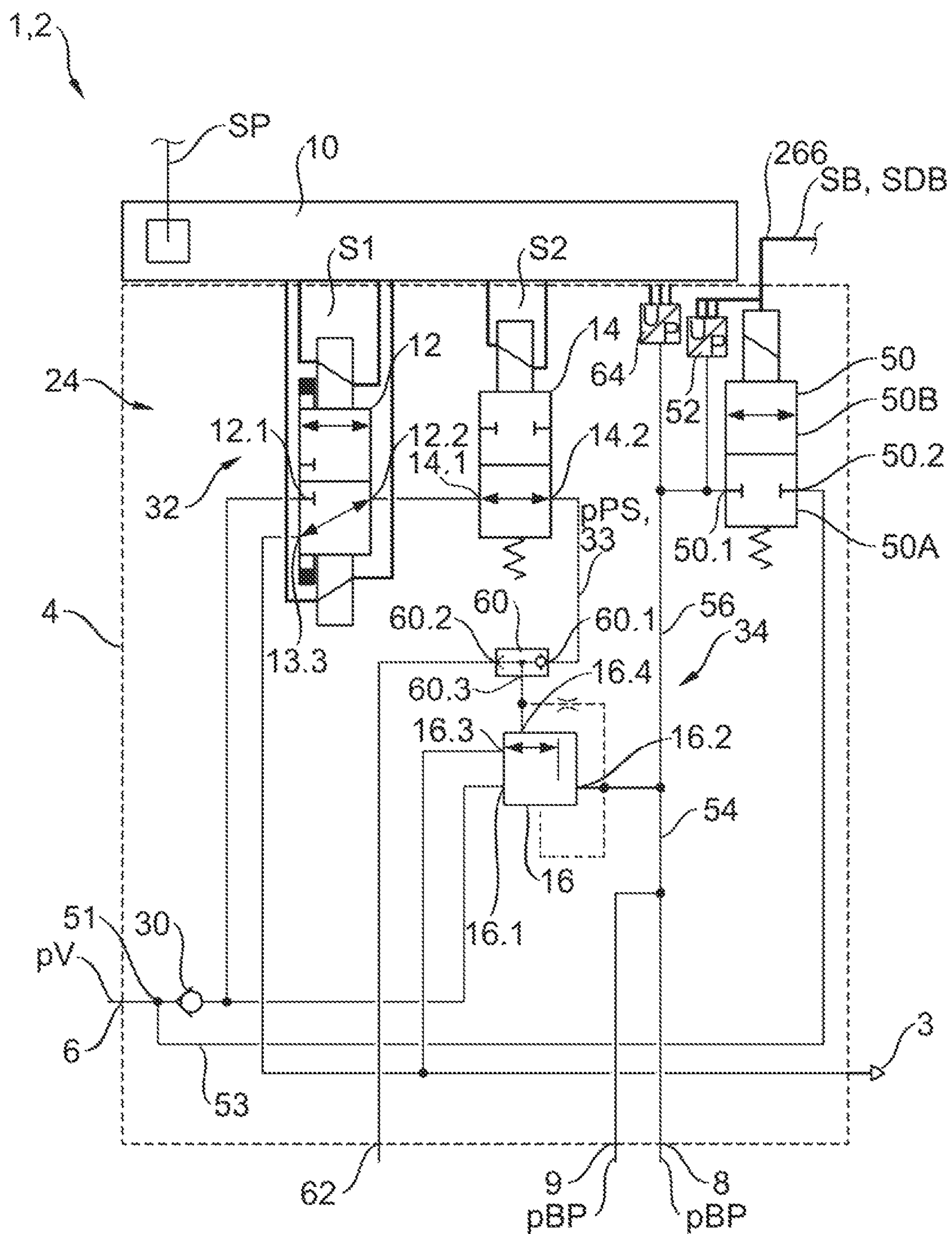
FIG. 1 shows a first embodiment of an electropneumatic parking brake device.

An electropneumatic parking brake device 1 can be configured as a parking brake module 2 in a first embodiment (FIG. 1). In addition, it has a module housing 4 at which a reservoir port 6, an air-exhaust port 3, and a first spring-loaded accumulator port 8 and a second spring-loaded accumulator port 9 are arranged. In addition, the electropneumatic parking brake device 1 includes a parking brake control unit 10 and a parking brake valve unit 24 which is activated by the parking brake control unit 10. The parking brake valve unit 24 is fundamentally formed as is known in the prior art and connected both to the reservoir port 6 and to the first and second spring-loaded accumulator ports 8, 9. The parking brake valve unit 24 receives reservoir pressure pV from the reservoir port 6 and, as a function of the first and second switching signals S1, S2 which are supplied by the parking brake control unit 10, sets a parking brake pressure pBP at the first and second spring-loaded accumulator port 8, 9. The first and second switching signals S1, S2 are supplied by the parking brake control unit 10 based on the receipt of a parking brake signal SP. The parking brake signal SP is supplied by a higher-level unit as will be described below in detail with reference to FIG. 2. It can also be provided that the parking brake signal SP is supplied directly at the parking brake valve unit 24 and in this respect the electropneumatic parking brake device 1 does not have an independent parking brake control unit 10 and instead is wired directly.

Specifically, in the embodiment shown here, the parking brake valve unit 24 has a pilot valve unit 32 and a main valve unit 34, as is known fundamentally. The pilot valve unit 32 includes in the embodiment shown here a bistable valve 12, with a first bistable valve port 12.1 which is connected to the reservoir port 6, with a second bistable valve port 12.2, and with a third bistable valve port 12.3 which is connected to the air-exhaust port 3. To be more precise, the first bistable valve port 12.1 is first connected to a non-return valve 30 which is here integrated into the module housing 4 and is connected upstream of the parking brake valve unit 24. The non-return valve 30 serves to prevent pressure from flowing from the parking brake valve unit 24 in the direction of the reservoir port 6. Reservoir pressure pV is thus supplied to the first bistable valve port 12.1 only by the reservoir pressure 6 via the non-return valve 30 but pressure equalization cannot take place in the opposite direction.

The second bistable valve port 12.2 is here connected to a holding valve 14 which is configured as a 2/2-way valve. The holding valve 14 has a first holding valve port 14.1 and a second holding valve port 14.2. The holding valve 14 is configured as a 2/2-way valve and is monostable. It is pretensioned in an open position and can be brought into a blocking position (not shown in FIG. 1) by supplying the second switching signal S2. The first holding valve port 14.1 is connected to the bistable valve 12, to be more precise to the second bistable valve port 12.2. The second holding valve port 14.2 is connected to the main valve unit 34. The bistable valve 12 and the holding valve 14 together form the pilot valve unit 32. It should be understood that the holding valve 14 can also be omitted. The pilot valve unit 32 sets, with a corresponding switching of the bistable valve 12 and the holding valve 14, a parking brake control pressure pPS at the main valve unit 34. In the embodiment shown here, the main valve unit 34 includes a relay valve 16 which has a relay valve reservoir port 16.1 connected to the reservoir port 6, a relay valve working port 16.2 connected to the first and second spring-loaded accumulator port 8, 9, a relay valve air-exhaust port 16.3 connected to the air-exhaust port 3, and a relay valve control port 16.4 connected to the pilot valve unit 32. The pilot valve unit 32 supplies the parking brake control pressure pPS at the relay valve control port 16.4, wherein the relay valve 16 then boosts the parking brake control pressure pPS and sets it as the parking brake pressure pBP at the relay valve working port 16.2. For this purpose, the relay valve 16 receives the reservoir pressure pV from the reservoir port 6. It should be understood that other volume-boosting valves such as, for example, a pneumatic switching valve, can be used instead of the relay valve 16.

In the embodiment shown specifically in FIG. 1, a shuttle valve 60 is also provided between the holding valve 14 and the relay valve 16. The shuttle valve 60 has a first shuttle valve port 60.1 which is here connected specifically to the pilot valve unit 32, namely in particular to the second holding valve port 14.2. The shuttle valve 60 has a second shuttle valve port 60.2 which is here connected to an anti-compounding port 62, and a third shuttle valve port 60.3 which is connected to the relay valve control port 16.4. The shuttle valve 60 is configured such that the higher of the pressure which is present in each case at the first shuttle valve port 60.1 and at the second shuttle valve port 60.2 is set at the third shuttle valve port 60.3. Both the shuttle valve 60 and the anti-compounding port 62 are optional and can both be omitted.

By correspondingly supplying the parking brake signal SP, the parking brake pressure pBP can thus be set at the first and second spring-loaded accumulator ports 8, 9 or air can be exhausted from the latter. The spring-loaded accumulator brake cylinders which are connected to the first and second spring-loaded accumulator port 8, 9 can consequently be released or applied. When the vehicle is parked, spring-loaded accumulator brake cylinders should always be applied such that unintentional rolling away of the vehicle can be prevented. However, when driving, the spring-loaded accumulator brake cylinders are released and air is supplied to them. If a fault now occurs in the parking braking system and in particular a fault in the parking brake control unit 10 or the pilot valve unit 32, a problem resolution strategy for exhausting air from the spring-loaded accumulator brake cylinders and the first and second spring-loaded accumulator port 8, 9 and consequently for applying the spring-loaded accumulator brake cylinders has proven to be to empty the corresponding parking brake reservoir connected to the reservoir port 6, this being referred to in technical language as "pumping down". However, if now a non-return valve 30 is provided as in the present case, it is also not possible for exhausting of air from the first and second spring-loaded accumulator ports 8, 9 to be achieved because pressure equalization from the parking brake valve unit 24 in the direction of the reservoir port 6 is prevented by the non-return valve 30. This is where the disclosure comes into play and solves this problem by a bypass valve 50. The bypass valve 50 forms a bypass for the parking brake valve unit 24 and, in the first embodiment shown in FIG. 1, is integrated into the module housing 4 and thus constitutes a module together with the parking brake valve unit 24.

In the first embodiment, the bypass valve 50 is configured as a 2/2-way valve and has a first bypass valve port 50.1 which is connected to the first and second spring-loaded accumulator ports 8, 9. Specifically, the first bypass valve port 50.1 is connected to a bypass branch line 56 which branches off from a parking brake pressure line 54 which connects the first and second spring-loaded accumulator ports 8, 9 to the relay valve working port 16.2. The second bypass valve port 50.2 is connected to the reservoir port 6, specifically to a bypass reservoir node 51 which, in the embodiment shown in FIG. 1, lies between the reservoir port 6 and the non-return valve 30. The bypass reservoir node is connected to a bypass reservoir line 53 which leads to the second bypass valve port 50.2. The bypass valve 50 is in a blocking position in a first switched position 50A and in a throughflow position in a second switched position 50B. The bypass valve 50 is deenergized in the blocking position 50A and is also pretensioned, spring-loaded, into this position. As soon as a bypass switching signal SB is supplied at the bypass valve 50, the latter is energized and switched into the throughflow position (not shown in FIG. 1). In the throughflow position 50B, the first bypass valve port is connected to the second bypass valve port 50.1, 50.2 and reservoir pressure pV can be supplied, via the bypass reservoir line 53, the bypass valve 50, and the bypass branch line 56 and the parking brake pressure line 54, to the first and second spring-loaded accumulator ports 8, 9 such that air can be supplied to the spring-loaded accumulator brake cylinders connected to the latter. However, if the parking brake reservoir connected to the reservoir port 6 is emptied and pumped down, by switching the bypass valve 50 into the throughflow position 50B, air can be exhausted from the first and second spring-loaded accumulator ports 8, 9 by the latter being pneumatically connected via the bypass valve 50 to the reservoir port 6 from which air is exhausted. As shown in FIG. 1, the bypass switching signal SB is not supplied by the parking brake control unit 10 and instead at a further electronic control unit which is independent of the parking brake control unit 10, as will be described below in more detail. In this way, air can both be supplied to and exhausted from the first and second spring-loaded accumulator ports 8, 9 even in the case of a fault in the parking brake control unit 10.

A bypass pressure sensor 52 measures the pressure which is present at the first bypass valve port 50.1, that is, the pressure set at the first and second spring-loaded accumulator ports 8, 9. The bypass pressure sensor 52 supplies a bypass pressure signal SDB but not at the parking brake control unit 10 and instead also at the further electronic control unit which also supplies the bypass switching signal SB. In this way, closed-loop control of the pressure set at the first and second spring-loaded accumulator ports 8, 9 can be achieved when this pressure is set via the bypass valve 50.

Figure 2:
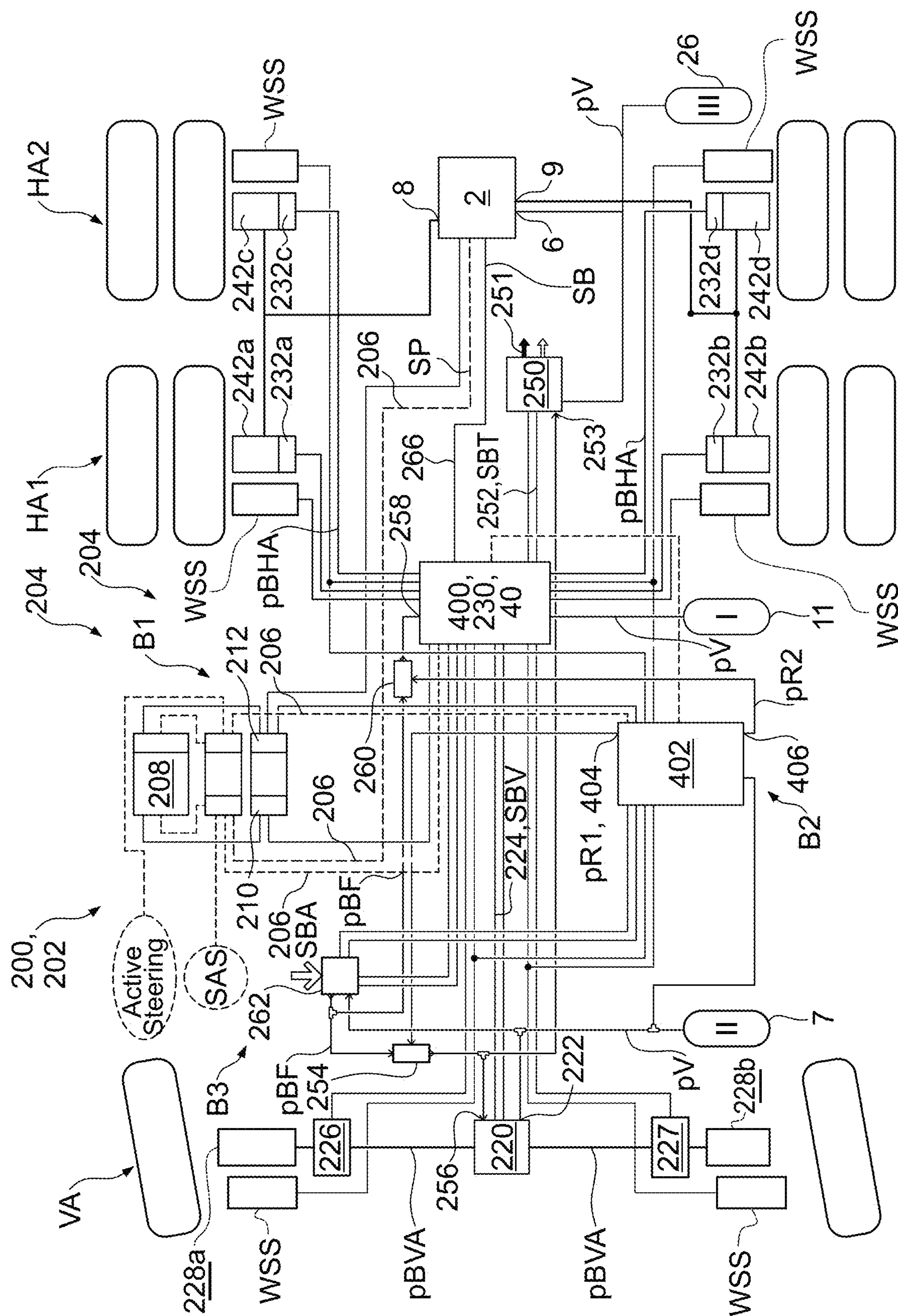
FIG. 2 shows a commercial vehicle with an electronically controllable pneumatic braking system and an electropneumatic parking brake device.

FIG. 2 now illustrates a vehicle 200, namely in particular a commercial vehicle 202, with a first axle A1, which is here a front axle VA, a second axle A2, which is here a first rear axle HA1, and a third axle A3, which is here a second rear axle HA2. The vehicle 200 includes an electronically controllable pneumatic braking system 204 which includes an operating level B1 and a first redundancy level B2.

In the operating level B1, the electronically controllable pneumatic braking system 204 includes a primary control unit 400, also referred to as a central module, which is connected to a unit for autonomous driving 208 via a vehicle bus 206 and receives braking request signals SBA from the unit. The electronically controllable pneumatic braking system 204 includes two independent voltage sources, namely a first voltage source 212 and a second voltage source 210, wherein the first voltage source supplies power to the electropneumatic parking brake device 1, as described below in detail. The primary control unit 400 is supplied with electrical energy from a second voltage source 210.

At the front axle VA, the electronically controllable pneumatic braking system 204 includes a front axle modulator 220 which is here configured as a single-channel modulator and receives reservoir pressure pV from a first compressed-air reservoir 7. For this purpose, the front axle modulator 220 includes in a known manner a front axle reservoir port 222 which is connected by a tube to the first compressed-air reservoir 7. The front axle modulator 220 is connected via a front axle signal line 224 to the primary control unit 400 and receives from the latter front axle brake signals SBV which permit switching of one or more electromagnetic valves (not shown) of the front axle modulator 220, wherein as a result the front axle modulator 220 sets a front axle service brake pressure pBVA which is set via first and second ABS valves 226, 227, suitably for the wheel, at a first front axle service brake actuator 228*a* and a second front axle service brake actuator 228*b*. The front axle signal line 224 can be implemented as direct cabling of the electromagnetic valves of the front axle modulator 220 to the primary control unit 400 such that end stages for electromagnetic valves of the front axle modulator 220 are preferably integrated into the central control unit 400. Alternatively, the front axle signal line 224 can also be configured as a bus connection (CAN bus), in particular when the front axle modulator 220 has its own intelligence.

The electronically controllable pneumatic braking system 204 also includes a rear axle modulator 230 which is here integrated into the primary control unit 400. The rear axle modulator 230 receives reservoir pressure pV from a second compressed-air reservoir 11. The primary control unit 400 converts the braking request signals SBA received via the vehicle bus 206 into rear axle brake signals SBH and switches one or more electromagnetic valves (not shown in detail here) of the rear axle modulator 230 such that a rear axle service brake pressure pBHA is generated which is set at first and second rear axle service brake actuators 232*a*, 232*b* at the first rear axle HA1 and at third and fourth rear axle service brake actuators 232*c*, 232*d* at the second rear axle HA2. The rear axle service brake pressure pBHA is here set, suitably for the side, and in this respect the rear axle modulator 230 is a two-channel modulator.

In addition, the electronically controllable pneumatic braking system 204 shown here includes an electropneumatic parking brake device 1 according to the disclosure which is here configured as a parking brake module 2 and is also connected to the vehicle bus 206 as well as to the first voltage source 212 and receives electrical energy from the latter. The electropneumatic parking brake device 1 is connected to a parking brake reservoir 26 and receives reservoir pressure pV from the latter. The electropneumatic parking brake device 1 is provided to set a parking brake pressure pBP via the first and second spring-loaded accumulator ports 8, 9 at first and second spring-loaded accumulator brake cylinders 242*a*, 242*b* at the first rear axle HA1, and third and fourth spring-loaded accumulator brake cylinders 242*c*, 242*d* at the second rear axle HA2.

The electronically controllable pneumatic braking system 204 is also provided for the purpose of supplying power to a trailer and for this purpose has a trailer control unit 250 which also receives reservoir pressure pV both from the first compressed-air reservoir 7 and from the second compressed-air reservoir 11. The trailer control unit 250 is connected to the primary control unit 400 and receives trailer brake signals SBT from the latter via a trailer signal line 252. In this respect, the trailer control unit 250 is also supplied with power from the first voltage source 212. The trailer control unit 250 sets a trailer brake pressure pBT at a trailer brake pressure port 251 as a function of the trailer brake signal SBT received. A normal service brake signal, an anti-jackknife brake signal for implementing an anti-jackknife function, or a trailer parking signal for parking the trailer can, for example, be transmitted via the trailer brake signal SBT.

In order to form a first redundancy level B2, which in this case is configured electrically, the electronically controllable pneumatic braking system 204 includes a secondary control unit 402 into which one or more electromagnetic valves (not shown here) are also integrated. The secondary control unit 402 is connected to the first compressed-air reservoir 7 and receives reservoir pressure pV from the latter. The secondary control unit 402 is also linked to the vehicle bus 206 and receives braking request signals SBA via the latter. In the embodiment shown here, it is, like the electropneumatic parking brake device 1, supplied with power from the first voltage source 212 which is independent of the second voltage source 210. The secondary control unit 402 is in addition capable of processing the braking request signals SBA and activating a working valve assembly integrated therein in order to set a first redundancy brake pressure pR1 at a first redundancy brake pressure port 404 and a second redundancy brake pressure pR2 at a second redundancy brake pressure port 406. The first redundancy brake pressure pR1 is here supplied to the front axle VA and the second redundancy brake pressure pR2 is here supplied to the rear axle HA1, HA2. To be more precise, the first redundancy brake pressure pR1 is set in a fundamentally known manner via a front axle shuttle valve 254 at a front axle redundancy port 256 of the front axle modulator 220. The front axle modulator 220 then implements the first redundancy brake pressure pR1 received thereat and, based thereon, redundantly sets the front axle brake pressure pBVA. For this purpose, the front axle modulator 220 can have in a fundamentally known manner a monostable redundancy valve and a relay piston or a pneumatically switchable main valve in order to set, with a boosted volume, the first redundancy brake pressure pR1 supplied at the front axle redundancy port 256. The first redundancy brake pressure pR1 is also set at a trailer redundancy port 253 in order thus to enable redundant braking of a trailer.

Correspondingly, the rear axle modulator 230 or the primary control unit 400 into which the rear axle modulator 230 is integrated has a rear axle redundancy port 258 at which the second redundancy brake pressure pR2 can be supplied via a rear axle shuttle valve 260. The secondary control unit 402 thus sets, suitably for the axle, the first and the second redundancy brake pressure pR1, pR2 and can thus be referred to as a two-channel modulator. The primary control unit 400 is configured to set the rear axle brake pressure pBHA based on the received second redundancy brake pressure pR2. For this purpose, the primary control unit 400 can in turn have in a fundamentally known manner a redundancy valve and a relay piston or a pneumatically switchable main valve in order to set, with a boosted volume, the second redundancy brake pressure pR2 as the rear axle brake pressure pBHA. In this way, an electronically controllable fallback level, in this case the first redundancy level B2, can be provided.

The electronically switchable pneumatic braking system 204 shown in FIG. 2 furthermore has a manually actuatable redundancy level B3 which includes a foot brake pedal 262 in the embodiment shown here. A foot brake pressure pBF can be set both at the front axle shuttle valve 254 and at the rear axle shuttle valve 260 via the foot brake pedal 262. The front and rear axle shuttle valves 254, 260 are in each case configured such that they set the higher of the foot brake pressure pBF present and the first or second redundancy pressure pR1, pR2 at the front axle modulator 220 or rear axle modulator 230. In this way, the set first and second redundancy brake pressure pR1, pR2 can, for example, be overridden by actuating the foot brake pedal 262. Also, conversely, the secondary brake module 402 can override the foot brake pressure pBF set by a driver.

Both in an operating situation and in a redundancy situation, when the control of the electronically controllable pneumatic braking system 204 is assumed by the secondary control unit 402, the electropneumatic parking brake device 1 and the parking brake module 2 should function. It can receive parking brake signals SP via the vehicle bus 206 and in this respect supply air to and exhaust it from the spring-loaded accumulator brake cylinders 242*a* to 242*d*. Should this not be possible, it can be effected according to the disclosure via the bypass valve 50 (cf FIG. 1). The bypass valve 50 is connected via a bypass signal line 266 to the primary control unit 400 which, in the embodiment shown here (FIG. 2), forms the further electronic control unit 40. The further electronic control unit 40 can supply the bypass signal SB in order to switch the bypass valve 50. The further electronic control unit 40 is supplied with electrical voltage from the second voltage source 210 such that the bypass valve 50 can also be switched when, for example, the first voltage source 212 has failed and as a result the electropneumatic parking brake device 1 does not function or no longer functions correctly, in particular the parking brake valve unit 24 and/or the parking brake control unit 10 does not function or functions incorrectly. In the embodiment shown here (FIG. 2), the secondary control unit 402 is connected to the first voltage source 212. In the situation in which it is connected, for example, to a third independent voltage source, the secondary control unit 402 could also function as a further electronic control unit 40. Within the scope of the disclosure, it is always preferred that the further electronic control unit 40, irrespective of its location in the braking system 204, is supplied with power from a voltage source which is not the voltage source to which the parking brake valve unit 24 and/or parking brake control unit 10 is connected. The bypass sensor supplies the bypass pressure signal SDB also via the bypass signal line 266 at the further electronic control unit 40, in this case the primary control unit 400. It can supply the bypass pressure signal SDB also via the vehicle bus 206 to further units in the braking system or higher-level units.

Figure 3:
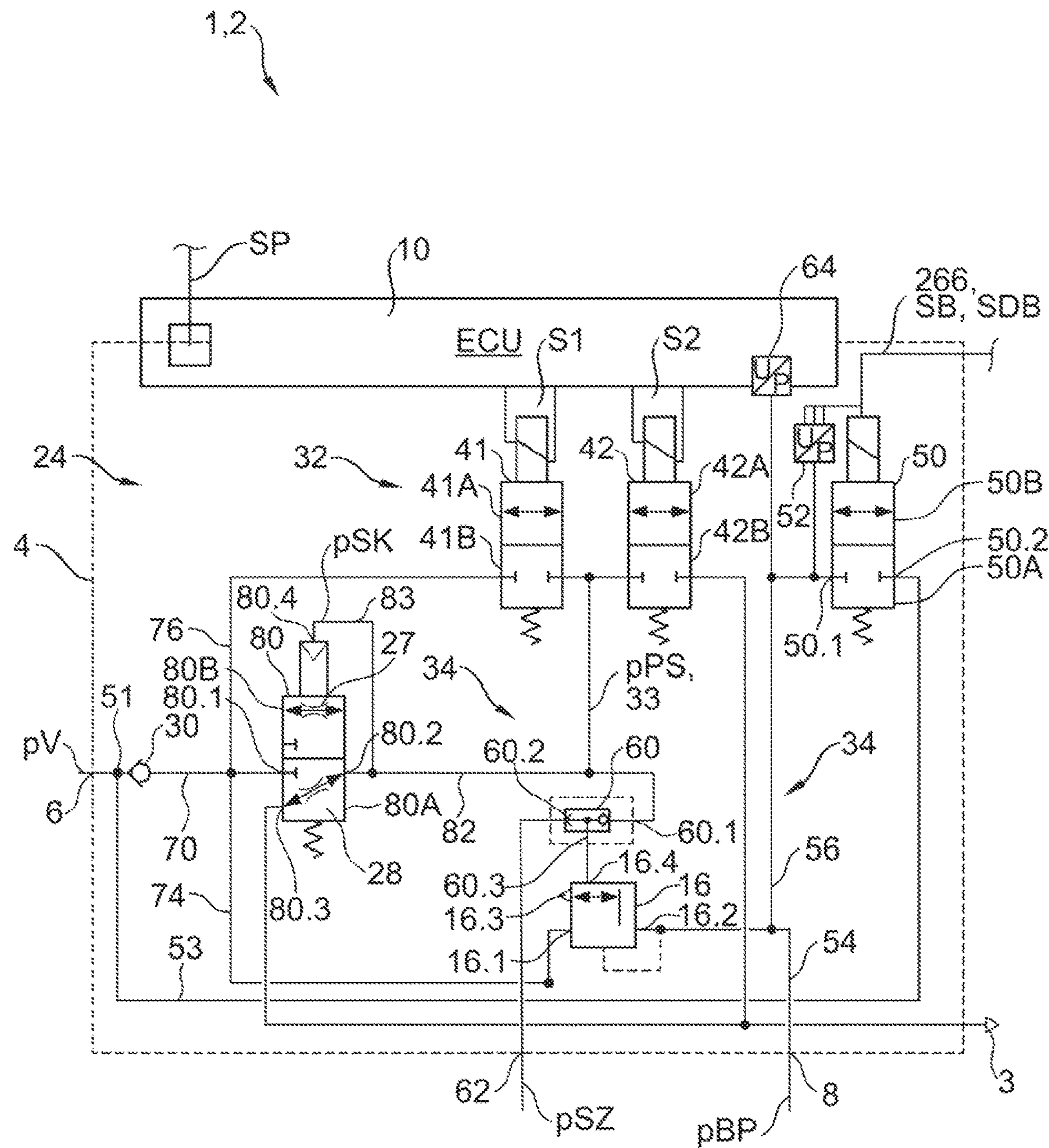
FIG. 3 shows a second embodiment of an electropneumatic parking brake device.
Figure 4:
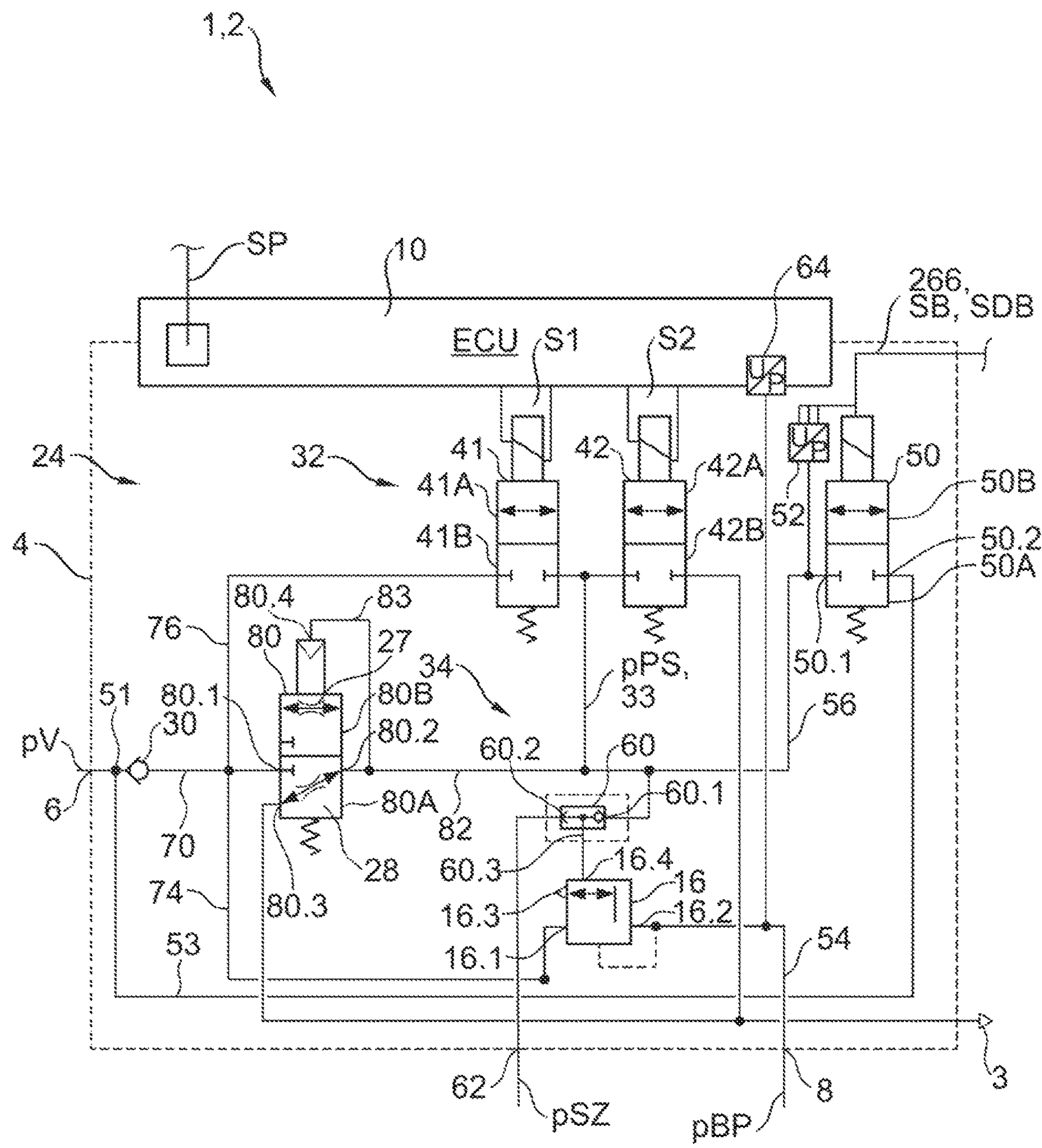
FIG. 4 shows a third embodiment of an electropneumatic parking brake device.

FIGS. 3 and 4 then show a second and a third embodiment of the electropneumatic parking brake device 1 according to the first embodiment (FIG. 1) which in turn is configured as a parking brake module 2, and wherein the bypass valve 50 is integrated into the parking brake module 2, namely into a common module housing 4. In particular the differences from the first embodiment (FIG. 1) are highlighted below. The same and similar elements are provided with the same reference signs such that for them reference is made to the above description in its entirety.

In the embodiment shown in FIG. 3, the pilot valve unit 32 differs from the pilot valve unit 32 according to the first embodiment (FIG. 1). The further elements are configured identically such that for them reference is made to the above description.

A reservoir pressure path 70 which is divided into a reservoir branch 74, a control branch 76, and a compensation path 82 extends from the reservoir port 6. The compensation path 82 connects the reservoir pressure path 70 pneumatically to a parking brake control pressure line 33 which supplies the parking brake control pressure pPS at the main valve unit 34.

A compensation valve 80 is arranged in the compensation path 82. The compensation valve 80 is configured as a 3/2-way valve. The compensation valve 80 has a first compensation valve port 80.1 which is pneumatically connected to the reservoir pressure path 70. The compensation valve 80 has a second compensation valve port 80.2 which is connected pneumatically to the compensation path 82. The compensation valve 80 has a third compensation valve port 80.3 which is connected pneumatically to an air-exhaust line 44. The air-exhaust line 44 is connected to an air-exhaust port 3 which exhausts air into the surroundings.

The compensation valve 80 has a compensation valve control port 80.4 which is connected pneumatically to the second compensation valve port 80.2 via a compensation control path 83. Pneumatic self-holding is preferably implemented via the compensation control path 83. A pressure present at the second compensation valve port 80.2, in particular a parking brake control pressure pPS, is supplied at the compensation valve control port 80.4 via the compensation control path 83.

In a second switched position 80B of the compensation valve 80, the first compensation valve port 80.1 is connected pneumatically to the second compensation valve port 80.2, and the third compensation valve port 80.3 is preferably blocked. In the second switched position 80B, the reservoir pressure path 70 is thus connected pneumatically to the compensation path 82 and thus to the parking brake control pressure line 33. In a first switched position 80A of the compensation valve 80, the second compensation valve port 80.2 is connected pneumatically to the third compensation valve port 80.3, and the first compensation valve port 80.1 is preferably blocked. In the first switched position 80A, the compensation path 82 and thus the parking brake control pressure line 33 is thus connected pneumatically to the air-exhaust port 3.

In the present case, the compensation valve 80 has a first restrictor 27 between the first compensation valve port 80.1 and the second compensation valve port 80.2. The first restrictor 27 advantageously has a nominal width which is less than that of the compensation path 82 and/or the reservoir pressure path 70. In the present case, the compensation valve 80 has a second restrictor 28 between the second compensation valve port 80.2 and the third compensation valve port 80.3. The second restrictor 28 advantageously has a nominal width which is less than that of the compensation path 82 and/or the air-exhaust line 44.

In the embodiment shown here (FIG. 3), the pilot valve unit 32 has a first pilot valve 41 and a second pilot valve 42 which are in each case configured as 2/2-way magnetic valves. In an open position 41A, the reservoir pressure pV can be supplied from the reservoir pressure path 70 as parking brake control pressure pPS to the parking brake control pressure line 33 via the first pilot valve 41. The parking brake control pressure line 33 is arranged between the first pilot valve 41 and the second pilot valve 42 and is or can be connected pneumatically to the relay valve control port 16.4 and the shuttle valve 60.

By switching the first pilot valve 41 into a blocking position 41B, the parking brake control pressure pPS can be trapped or held in the parking brake control pressure line 33, in particular at the relay valve control port 16.4, for permanent actuation. The second pilot valve 42 is here likewise in a blocking position 42B. In accordance with the structure of the pilot valve unit 32 with a first pilot valve 41 and a second pilot valve 42, the parking brake control unit 10 supplies the first switching signal S1 for the purpose of activating the first pilot valve 41, and the second switching signal S2 for the purpose of activating the second pilot valve 42. By switching the second pilot valve 42 into an open position 42A, the parking brake control pressure line 33 can be connected pneumatically to the air-exhaust line 44 for the purpose of exhausting air from the relay valve control port 16.4.

The parking brake control pressure line 33 can additionally, as already known from the first embodiment, be connected pneumatically to the anti-compounding port 62. An additional parking brake pressure pSZ can be supplied via the anti-compounding port 62 to the parking brake control pressure line 33 and in particular to the relay valve control port 16.4 in order to set a parking brake pressure pBP at the spring-loaded accumulator port 8, 9 independently of the pilot valve unit 32. In particular, the additional parking brake pressure pSZ can be supplied by a service brake function (not illustrated here) in order to implement an anti-compounding function.

The electropneumatic parking brake device 1 has a parking brake pressure sensor 64 which is connected pneumatically to the spring-loaded accumulator port 8, 9 for the purpose of measuring the parking brake pressure pBP.

The third embodiment according to FIG. 4 is based on the second embodiment according to FIG. 3. The only difference between the third embodiment (FIG. 4) and the second embodiment (FIG. 2) is that the bypass branch line 56 does not branch off from the parking brake pressure line 54, that is, downstream from the relay valve 16, and instead between the pilot valve unit 32 and the main valve unit 34 such that the bypass valve 50 can exhaust or supply the parking brake control pressure pPS, depending on the switched position. Air volume efficiency can be increased as a result.

Figure 5:
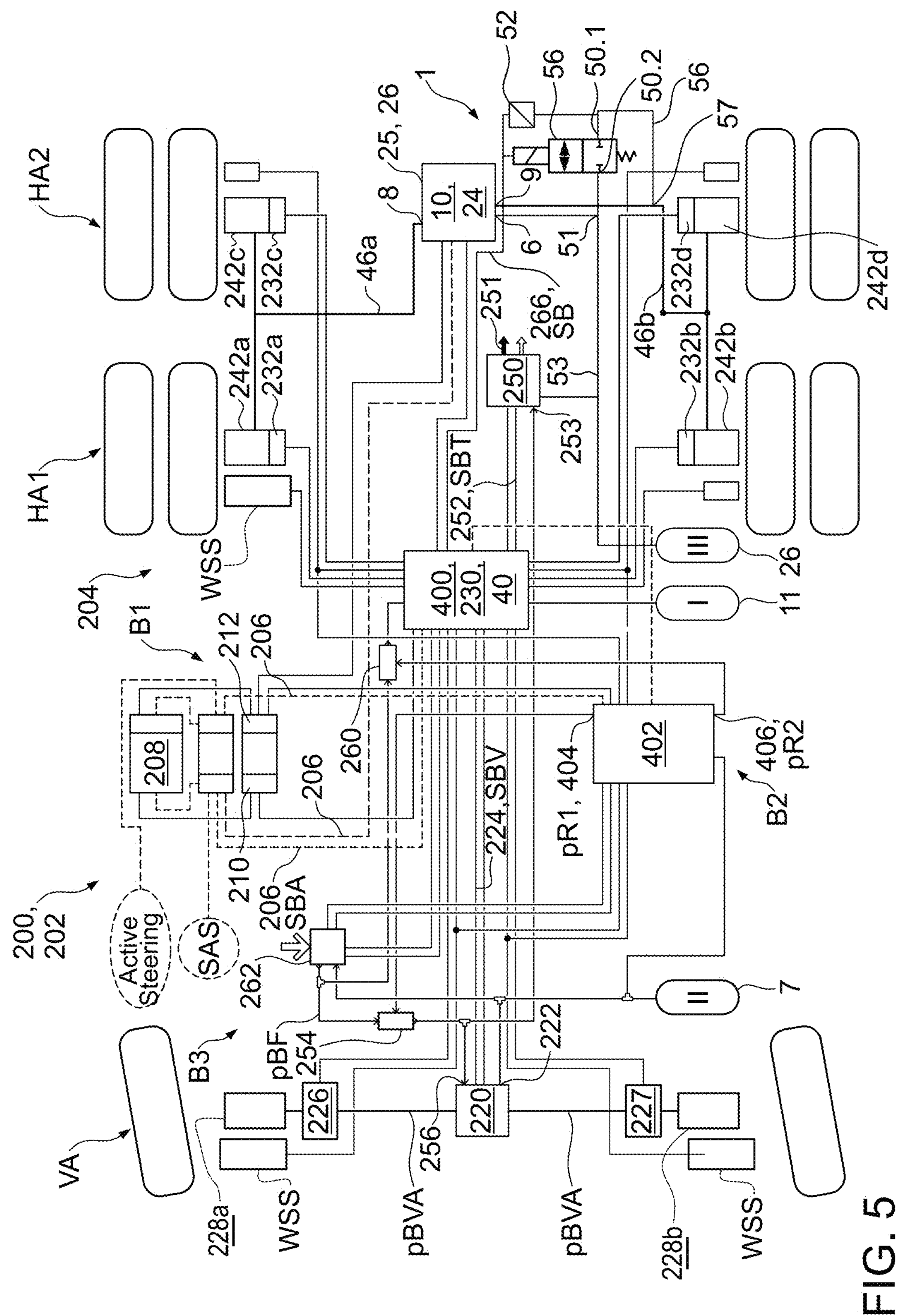
FIG. 5 shows a second embodiment of a commercial vehicle with an electronically controllable pneumatic braking system and an electropneumatic parking brake device.

FIG. 5 now shows a second vehicle 200 which is based essentially on the embodiment in FIG. 1 such that the same and similar elements are again provided with the same reference signs and in particular the differences are highlighted below. In contrast to the vehicle 200 according to FIG. 2, the vehicle according to FIG. 5 has an electropneumatic parking brake device 1 in which the bypass valve 50 is arranged separately and outside the parking brake valve unit 24. The parking brake valve unit 24, together with the parking brake control unit 10, is integrated into a conventional parking brake module 25. The parking brake module 25 has a parking brake module housing 25*a*. The bypass valve 50 can be flange-mounted to the parking brake module housing 25*a* or be installed in the braking system, separately and remote therefrom. The bypass branch line 56 then branches off externally from the parking brake module 25, and to be precise from a spring-loaded accumulator brake pressure line 46*a*, 46*b* which runs from the first spring-loaded accumulator port 8 to the first and third spring-loaded accumulator brake cylinders 242*a*, 242*c* and from the second spring-loaded accumulator port 9 to the second and fourth spring-loaded accumulator brake cylinders 242*b*, 242*d*. It is functionally irrelevant from which of the first and second spring-loaded accumulator brake pressure line 46*a*, 46*b* the bypass branch line 56 branches off and a choice should be made such that as little structural space as possible is achieved. In the embodiment shown here (FIG. 5), the bypass branch line 56 branches off from the second spring-loaded accumulator brake pressure line 46*b* via a bypass branch node 57. Because (as illustrated in FIG. 1) the first and second spring-loaded accumulator ports 8, 9 are connected directly and with no further interconnections inside the electropneumatic parking brake module 2, it is sufficient to exhaust air from or supply it to one of the first and second spring-loaded accumulator brake pressure lines 46*a*, 46*b* in order to supply air to or exhaust it from all four spring-loaded accumulator brake cylinders 242*a*-242*d*.

Figure 6:
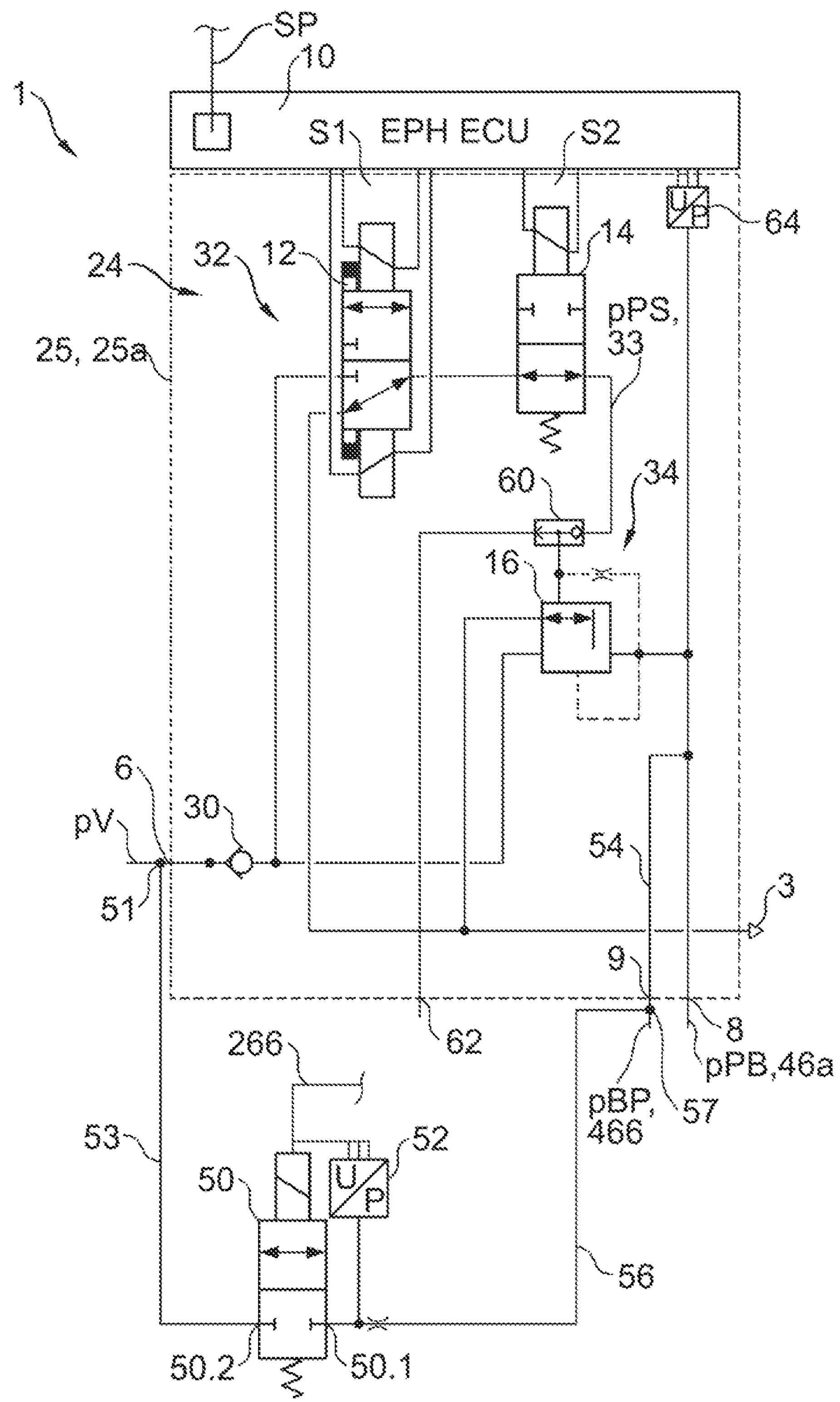
FIG. 6 shows a fourth embodiment of an electropneumatic parking brake device; and, FIG. 7 shows a fifth embodiment of an electropneumatic parking brake device.
Figure 7:
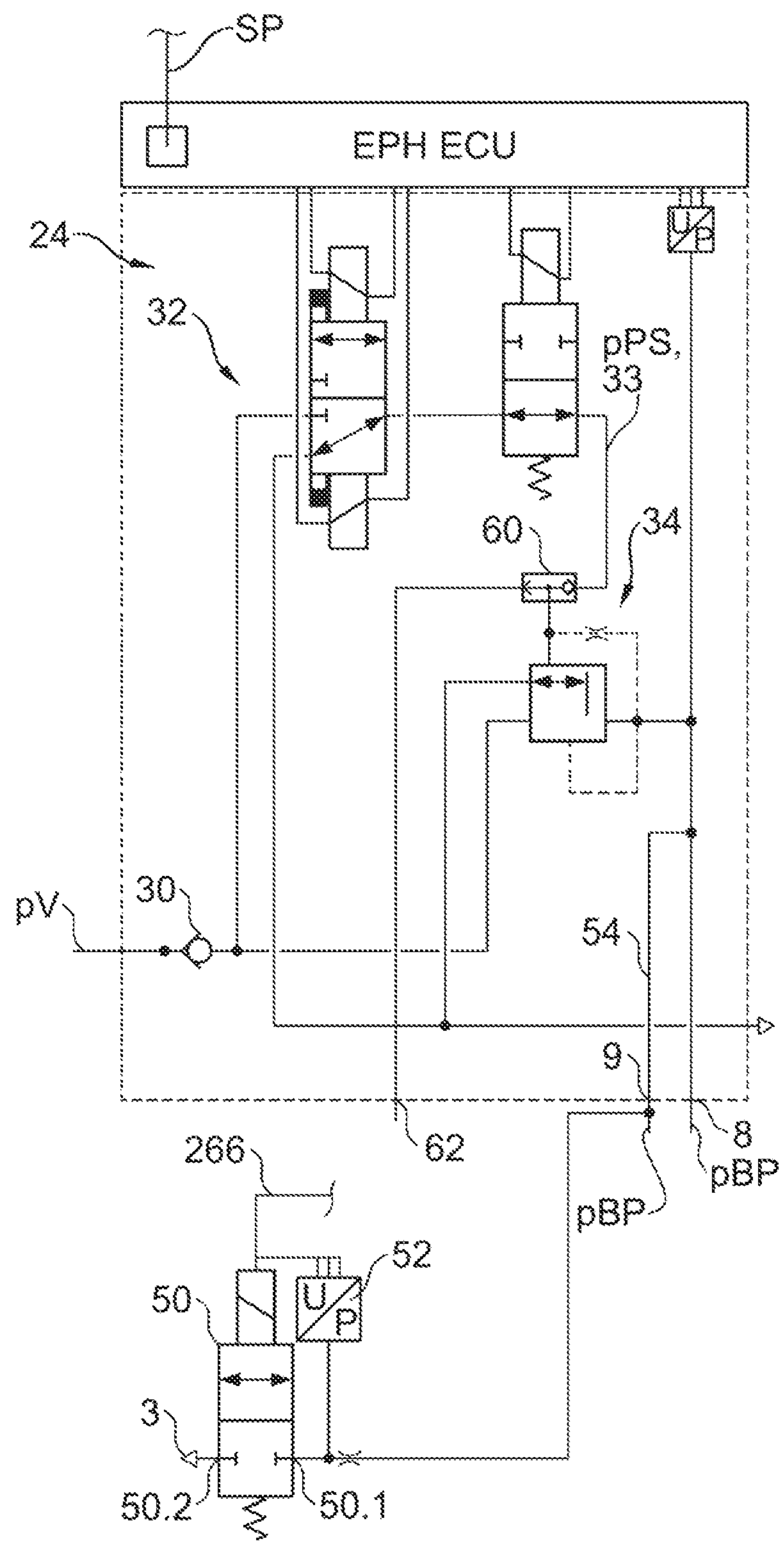

FIGS. 6 and 7 now show embodiments which can be used within the scope of the vehicle 200 according to FIG. 5 and in this respect likewise include externally arranged bypass valves 50. The same and similar elements are in turn provided with the same reference signs such that reference can be made to the above description in its entirety. In particular the differences from the preceding embodiments will be highlighted below.

The embodiment shown in FIG. 6 is oriented largely on the embodiment shown in FIG. 1 and in particular the pilot valve unit 32 and the main valve unit 34 have an identical configuration.

In conformity with the embodiment shown in FIG. 5, the bypass branch line 56 branches off externally from the parking brake module housing 25*a* and thus also downstream from the second spring-loaded accumulator port 9. The bypass reservoir line 53 likewise runs externally to the parking brake module housing 25*a* and branches off from the bypass reservoir node 51 which is arranged upstream from the reservoir port 6, that is, between the parking brake reservoir 26 and the reservoir port 6. The bypass valve 50 is thus assembled completely parallel to the parking brake valve unit 24 and can connect the second spring-loaded accumulator brake pressure line 46*b* immediately and directly to the parking brake reservoir 26.

The embodiment shown in FIG. 7 now differs from the embodiment shown in FIG. 6 in that the second bypass valve port 50.2 is not connected via a bypass reservoir line 53 to the parking brake reservoir 26 but to an air-exhaust point 3. In this embodiment, it is thus not possible to supply air to the spring-loaded accumulator port 8 but only to exhaust air from it.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 electropneumatic parking brake device
2 parking brake module
3 air-exhaust point
3 air-exhaust point/port
6 reservoir port
7 first compressed-air reservoir
8 first spring-loaded accumulator port
9 second spring-loaded accumulator port
10 parking brake control unit
11 second compressed-air reservoir
12 bistable valve
12.1 first bistable valve port
12.2 second bistable valve port
12.3 third bistable valve port
14 holding valve
14.1 first holding valve port
14.2 second holding valve port
16 relay valve
16.1 relay valve reservoir port
16.2 relay valve working port
16.3 relay valve air-exhaust port
16.4 relay valve control port
24 parking brake valve unit
25 parking brake module
25*a* parking brake module housing
26 parking brake reservoir
27 first restrictor
28 second restrictor
30 non-return valve
32 pilot valve unit
33 parking brake control pressure line
34 main valve unit
40 further electronic control unit
41 first pilot valve
41A open position of the first pilot valve
41B blocking position of first pilot valve
42 second pilot valve
42A open position of the second pilot valve
42B blocking position of second pilot valve
44 air-exhaust line
46*a* first spring-loaded accumulator brake pressure line
46*b* second spring-loaded accumulator brake pressure line
50 bypass valve
50.1 first bypass valve port
50.2 second bypass valve port
50A blocking position of the bypass valve
50B throughflow position of the bypass valve
51 bypass reservoir node
52 bypass pressure sensor
53 bypass reservoir line
54 parking brake pressure line
56 bypass branch line
57 bypass branch node
60 shuttle valve
60.1 first shuttle valve port
60.2 second shuttle valve port
62 anti-compounding port
64 parking brake pressure sensor
70 reservoir pressure path
74 reservoir branch of the reservoir pressure path
76 control branch of the reservoir pressure path
80 compensation valve
80A first switched position of the compensation valve
80B switched position of the compensation valve
80.1 first compensation valve port
80.2 second compensation valve port
80.3 third compensation valve port
80.4 compensation valve control port
82 compensation path

83 compensation control path
200 vehicle
202 commercial vehicle
204 electronically controllable pneumatic braking system
206 vehicle bus
208 unit for autonomous driving
210 second voltage source
212 first voltage source
220 front axle modulator
222 front axle reservoir port
224 front axle signal line
226 first ABS valve
227 second ABS valve
**228*a*** first front axle service brake actuator
**228*b*** second front axle service brake actuator
230 rear axle modulator
**232*a*** first rear axle service brake actuator
**232*b*** second rear axle service brake actuator
**232*c*** third rear axle service brake actuator
**232*d*** fourth rear axle service brake actuator
**242*a*** first spring-loaded accumulator brake cylinder
**242*b*** second spring-loaded accumulator brake cylinder
**242*c*** third spring-loaded accumulator brake cylinder
**242*d*** fourth spring-loaded accumulator brake cylinder
250 trailer control unit
251 trailer brake pressure port
252 trailer signal line
253 trailer redundancy port
254 front axle shuttle valve
256 front axle redundancy port
258 rear axle redundancy port
260 rear axle shuttle valve
262 foot brake pedal
264 spring-loaded accumulator port
266 bypass signal line
300 first electronic control unit
302 second electronic control unit
400 primary control unit
402 secondary control unit
404 first redundancy brake pressure port
406 second redundancy brake pressure port
A1 first axle
A2 second axle
B1 operating level
B2 first redundancy level
B3 second redundancy level
HA1 first rear axle
HA2 second rear axle
pBF foot brake pressure
pBHA rear axle service brake pressure
pBP parking brake pressure
pBVA front axle service brake pressure
pPS parking brake control pressure
pR1 first redundancy brake pressure
pR2 second redundancy brake pressure
pSZ additional parking brake pressure
pV reservoir pressure
S1 first switching signal
S2 second switching signal
SB bypass switching signal
SBA braking request signals
SBT trailer braking signals
SBV front axle braking signals
SDB bypass pressure signal
SP parking brake signal
VA front axle

The invention claimed is:

1. An electropneumatic parking brake device for supplying air to and exhausting air from at least one spring-loaded accumulator brake cylinder of an electronically controllable pneumatic braking system for a vehicle, the electropneumatic parking brake device comprising:

a parking brake valve unit having a reservoir port for receiving reservoir pressure from a parking brake reservoir, wherein said parking brake valve unit is configured to set a parking brake pressure at least at one spring-loaded accumulator port in dependence upon a parking brake signal;

a non-return valve arranged between said parking brake valve unit and the parking brake reservoir in order to prevent compressed air from flowing back from said parking brake valve unit to the parking brake reservoir; and, a bypass valve configured to be switched to supply air to and exhaust air from said spring-loaded accumulator port, wherein said bypass valve is configured to be activated and switched independently of said parking brake valve unit.

2. The electropneumatic parking brake device of claim 1, wherein said bypass valve is electromagnetic and is configured to be activated by a further electronic control unit which is independent of said parking brake valve unit.

3. The electropneumatic parking brake device of claim 2 further comprising a bypass pressure sensor for detecting the parking brake pressure set at said spring-loaded accumulator port, wherein said bypass pressure sensor is connected to said further electronic control unit independent of said parking brake valve unit.

4. The electropneumatic parking brake device of claim 1, wherein said bypass valve is monostable and is configured to assume a blocking position and a throughflow position, wherein said bypass valve is stable in said blocking position.

5. The electropneumatic parking brake device of claim 1, wherein said bypass valve has a first bypass valve port connected to said spring-loaded accumulator port or to a main valve unit upstream from said spring-loaded accumulator port, and a second bypass valve port connected to an air-exhaust point.

6. The electropneumatic parking brake device of claim 1, wherein said bypass valve has a first bypass valve port connected to said spring-loaded accumulator port or to a main valve unit upstream from said spring-loaded accumulator port, and a second bypass valve port connected to the parking brake reservoir upstream from said non-return valve.

7. The electropneumatic parking brake device of claim 1, wherein said bypass valve is formed as one structural unit with said parking brake valve unit.

8. The electropneumatic parking brake device of claim 1, wherein said bypass valve is accommodated with said parking brake valve unit in a module housing.

9. The electropneumatic parking brake device of claim 1, wherein said bypass valve is connected directly to a parking brake pressure line connected to said spring-loaded accumulator port downstream of said spring-loaded accumulator port.

10. The electropneumatic parking brake device of claim 1, wherein said parking brake valve unit has a pilot valve unit and a main valve unit; and, said pilot valve unit is configured to supply a parking brake control pressure at said main valve unit which then sets the parking brake pressure at said spring-loaded accumulator port as a function of the parking brake control pressure.

11. The electropneumatic parking brake device of claim 10, wherein said bypass valve is connected to said main valve unit, wherein the parking brake control pressure is exhaustable via said bypass valve.

12. The electropneumatic parking brake device of claim 11, wherein said bypass valve is connected to a bypass branch line which branches off from a parking brake control pressure line via which the parking brake control pressure is supplied at said main valve unit from said pilot valve unit.

13. The electropneumatic parking brake device of claim 12 further comprising:

a first shuttle valve having a first shuttle valve port connected to said pilot valve unit, a second shuttle valve port connected to an anti-compounding port, and a third shuttle valve port connected to said main valve unit and disposed in said parking brake control pressure line; and, said first shuttle valve being configured to set a higher of pressures present at said first shuttle valve port and at said second shuttle valve port at said third shuttle valve port.

14. The electropneumatic parking brake device of claim 13, wherein said bypass branch line branches off between said first shuttle valve port and said pilot valve unit.

15. The electropneumatic parking brake device of claim 10, wherein said parking brake valve unit has a compensation valve configured to maintain the parking brake control pressure set at said main valve unit by said pilot valve unit and thus at least partially compensate a leak at least at one of said pilot valve unit and said main valve unit.

16. The electropneumatic parking brake device of claim 15, wherein:

said compensation valve is a pneumatically switchable 3/2-way valve and has a first compensation valve port connected to said non-return valve, a second compensation valve port connected to a line carrying the parking brake control pressure, and a third compensation valve port connected to an air-exhaust point;

said compensation valve is pretensioned, spring-loaded, into a first switched position in which said second compensation valve port is connected to said third compensation valve port and, if a compensation valve control pressure supplied at a compensation valve control port exceeds a compensation valve threshold value, said compensation valve switches into a second switched position in which said first compensation valve port is connected to said second compensation valve port; and, said compensation valve control pressure is a pressure present or set at said second compensation valve port, as a result of which pneumatic self-holding for said compensation valve is implemented.

17. The electropneumatic parking brake device of claim 16, wherein said compensation valve is configured so that it is flow-restricted such that said connection of said first compensation valve port to said second compensation valve port and said connection of the second compensation valve port to said third compensation valve port is in each case flow-restricted.

18. The electropneumatic parking brake device of claim 1, wherein said parking brake valve unit and said bypass valve are configured to be supplied with electrical voltage by two independent voltage sources.

* * * * *